(12) United States Patent
Campbell et al.

(10) Patent No.: US 6,183,903 B1
(45) Date of Patent: Feb. 6, 2001

(54) PLASTIC BATTERY CONTAINER HAVING REDUCED END WALL DEFLECTION

(75) Inventors: Kris Campbell, Poplar Grove; John E. Kopala, Elgin, both of IL (US)

(73) Assignee: GNB Technologies, Inc., Lombard, IL (US)

(*) Notice: Under 35 U.S.C. 154(b), the term of this patent shall be extended for 0 days.

(21) Appl. No.: 09/017,899

(22) Filed: Feb. 3, 1998

(51) Int. Cl.[7] ............................. H01M 2/04; H01M 2/02
(52) U.S. Cl. ............................. 429/176; 429/186; 429/66
(58) Field of Search .................................. 429/163, 176, 429/178, 186, 187, 66

(56) References Cited

U.S. PATENT DOCUMENTS

| | | |
|---|---|---|
| D. 59,200 | 10/1921 | Davis et al. . |
| D. 62,295 | 5/1923 | Weitling . |
| 984,095 | 2/1911 | Lesley . |
| 1,364,358 * | 1/1921 | Edison . |
| 1,508,428 | 9/1924 | Wagner . |
| 1,564,173 | 12/1925 | Ford et al. . |
| 1,612,582 * | 12/1926 | Holland . |
| 1,888,890 | 12/1932 | Sandman . |
| 2,385,127 * | 9/1945 | Carlile . |
| 3,607,440 | 9/1971 | Daniel .................................. 136/166 |
| 3,816,181 * | 6/1974 | Buchethal . |
| 4,063,007 | 12/1977 | Spiegelberg .......................... 429/176 |
| 4,118,265 * | 10/1978 | Hardigg ................................ 156/242 |
| 4,250,232 * | 2/1981 | Davidson ............................... 429/56 |
| 4,309,818 | 1/1982 | Kline .................................... 29/623.1 |
| 4,634,642 | 1/1987 | Lopez-Doriga ....................... 429/121 |
| 4,693,949 | 9/1987 | Kellett et al. ......................... 429/178 |
| 4,732,826 | 3/1988 | Hardigg ................................ 429/176 |
| 5,384,212 | 1/1995 | Heiman et al. ....................... 429/143 |
| 5,492,779 * | 2/1996 | Ronning ............................... 429/120 |

* cited by examiner

Primary Examiner—Maria Nuzzolillo
Assistant Examiner—Tracy Dove
(74) Attorney, Agent, or Firm—Leydig, Voit & Mayer, Ltd.

(57) ABSTRACT

A plastic battery container for a recombinant sealed lead-acid battery having reduced end wall deflection, the end wall comprising a base portion from which extends a series of integrally molded ribs disposed at approximately +/−45° to the horizontal, substantially all intersection points of the ribs with the base portion having a rounded character to enhance processing characteristics.

18 Claims, 3 Drawing Sheets

PLASTIC BATTERY CONTAINER HAVING REDUCED END WALL DEFLECTION

FIELD OF THE INVENTION

This invention relates generally to battery containers for lead acid batteries, and more particularly to battery container designs for minimizing container end panel distortion in recombinant sealed batteries.

BACKGROUND OF THE INVENTION

Lead-acid batteries and cells have been known for a substantially long period of time and have been employed commercially in a relatively wide variety of applications. Such applications have ranged from starting, lighting and ignition for automobiles, trucks and other vehicles (often termed "SLI batteries") to marine and golf cart applications and to various stationary and motive power source applications (sometimes termed "industrial battery" applications).

The lead-acid electrochemical system provides a reliable energy source which is capable of being manufactured in automated production while providing acceptable quality. At this time, battery containers are generally manufactured in large volumes as injection molded plastic parts. As the battery container includes five of the six sides of the exterior of the battery, this component is largely responsible for the final dimensions of the battery, as well as its cosmetic appearance. Beyond the appearance of the battery, the dimensions of the upper opening of the container must be sufficiently precise to permit a seal between the container and the lid of the battery in order to ensure proper operation and prevent leakage.

During use, however, lead-acid batteries may develop or be exposed to extremely high operating temperatures and pressures. The electrochemical reactions within the cells of a lead-acid battery, particularly in a recombinant sealed battery, result in the development of high pressures, as well as high temperatures. While the exact parameters reached will vary based upon the particular battery design, the internal pressure of a battery, for example, may reach on the order of three to six pounds per square inch (3–6 p.s.i.), while the temperature may reach over 200° F.

These high pressures and temperatures within the battery may cause the battery container to deflect and distort. This deflection may be restrained along the side walls of the container inasmuch as the partitions between the cells extend crosswise through the battery from side wall to side wall. Accordingly, the bulk of such deflection occurs on the end walls of the container where there are no interior partitions to restrain the deflection. In tests of a Group 27 battery of the assignee of the present invention, the end wall of the container having vertical ribbing was measured to deflect 0.085 inch at 1 p.s.i., 0.236 inch at 3 p.s.i., and 0.342 inch at 5 p.s.i.

This deflection may adversely affect the performance of the battery as well as the cosmetic appearance. As the end walls deflect, the cells expand, allowing the plates to separate and pull apart. This reduction in cell compression results in a corresponding reduction in battery performance. Further, the deflection of the end walls increases the effective length of the battery and decreases the overall attractiveness thereof. It has further been observed that in severe cases, the plastic container may crack at points of high deflection and stress, resulting in leaks.

This problem may be exacerbated by the environmental conditions of the battery. For example, current vehicles, particularly automobiles, emphasize aerodynamic styling and are equipped with a variety of driver comfort features and safety devices. These features have resulted in such vehicles operating in many situations with very high underhood engine temperatures. The battery may be located in the front of the underhood compartment, where there is little air movement, or where the engine fan blows hot air directly onto the battery. Accordingly, during stop-and-go driving, or while the engine of the vehicles is idling, there is typically very little air or wind movement, causing the underhood air temperatures to often exceed 200° F. in some parts of the United States. Thus, these increased temperatures may further contribute to distortion of the battery container during operation.

In the early part of the twentieth century and up to the sixties, battery containers were constructed of molded hard rubber, sometimes using coal as a filler. On occasion, the molded rubber container was surrounded by a wooden box in order to permit easy handling or restrain the walls of the container. Further, because the container was made of molded rubber, it could readily be molded to a thicker dimension in order to minimize any deflection thereof. Recombinant sealed batteries, however, were not developed and did not come into common use until the late 1970's and early 1980's. Accordingly, the high internal pressures associated therewith were not typically even a problem with batteries which utilized molded hard rubber containers prior to the advent of the plastic battery container. Accordingly, deflection of the end walls due to the batteries developing high internal pressures or temperatures during use was not typically a design consideration with molded rubber containers. Molded rubber containers also had certain disadvantages. Due to the thick, dense walls of the container, they are relatively heavy. Additionally, such containers were relatively fragile.

While molded plastic containers are advantageous in view of size and weight, molding of plastic presents certain processing and design limitations, particularly in recombinant sealed batteries. In particular, molded plastic components exhibit different shrinkage factors depending upon the geometry and part thickness. As a result, and contrary to the design of molded hard rubber containers, the thickness of the end walls of a battery container may not be disparately greater than the thickness of the side walls or the partitions between the cell of the container without incumbent molding difficulties. Accordingly, battery designers have sometimes incorporated vertical and horizontal ribbing in the battery container in order to reduce container wall deflection. This design feature, however, has met with limited success.

OBJECTS OF THE INVENTION

Accordingly, it is the primary object of the invention to provide a container for a recombinant sealed lead-acid battery wherein the end walls demonstrate reduced deflection over those of conventional end walls. It is a more specific object of the invention to provide a lead-acid battery container that substantially retains the desired dimensions during use.

It is a further object of the invention to provide a battery container for a recombinant sealed lead-acid battery that may be economically manufactured. It is a more specific object to provide a recombinant sealed lead-acid battery that may be molded in a reduced molding time using conventional plastic materials and conventional injection molding techniques. An additional object of the invention is to provide a container for a recombinant sealed lead-acid battery that requires reduced plant labor for processing thereof.

A related object is to provide a container for a recombinant sealed lead-acid battery wherein the design displays good material characteristics.

SUMMARY OF THE INVENTION

In accomplishing these and other objects of the invention, there is provided a plastic container for a recombinant sealed lead-acid battery wherein the structure of at least one of the end walls includes a base portion having a series of ribs integrally molded therewith. The ribs are disposed on the order of +/−45° to the horizontal. Preferably, at least four or more substantially parallel ribs are provided in a grid-like arrangement. The ribs thus define an arrangement of diamond-shaped flat sections along the base portion.

All edges associated with the ribs are preferably rounded, that is, the crest of each rib, as well as the lines at which the sides of the rib meet the edges of the diamonds are rounded. The corners of the diamonds are likewise rounded, and round up into the intersections of the ribs.

It will thus be appreciated that the ribs increase the effective strength and thickness of the end walls without the thickness of the end wall being uniformly increased. Moreover, the rounded character of the ribs provides many processing advantages that minimize fabrication costs. First, during molding, there is increased plastic mold flow, resulting in a part with less porosity and quicker molding time. Further, a container molded according to the inventive design may be easily demolded, decreasing cycle time and minimizing the opportunity for scrap parts. Additionally, during further processing, the rounded corners of the end wall retain a minimal amount of water, further reducing plant labor.

While rib edges having square corners as opposed to rib corners to having a rounded character will likewise operate to reduce outward expansion of the end walls, the processing characteristics of a battery container having end walls with diagonal ribs having square corners are less advantageous than those having rounded edges. For example, containers having ribs with such square edges are not as easily demolded as those having round edges. Further, chipping can occur at these sharp corners when battery containers contact during the manufacturing processing and handling. This not only detracts from the aesthetic appearance of the battery container, but can actually cause serious damage to the container, which may consequently result in performance problems.

DESCRIPTION OF THE PREFERRED EMBODIMENT

Figure 1:
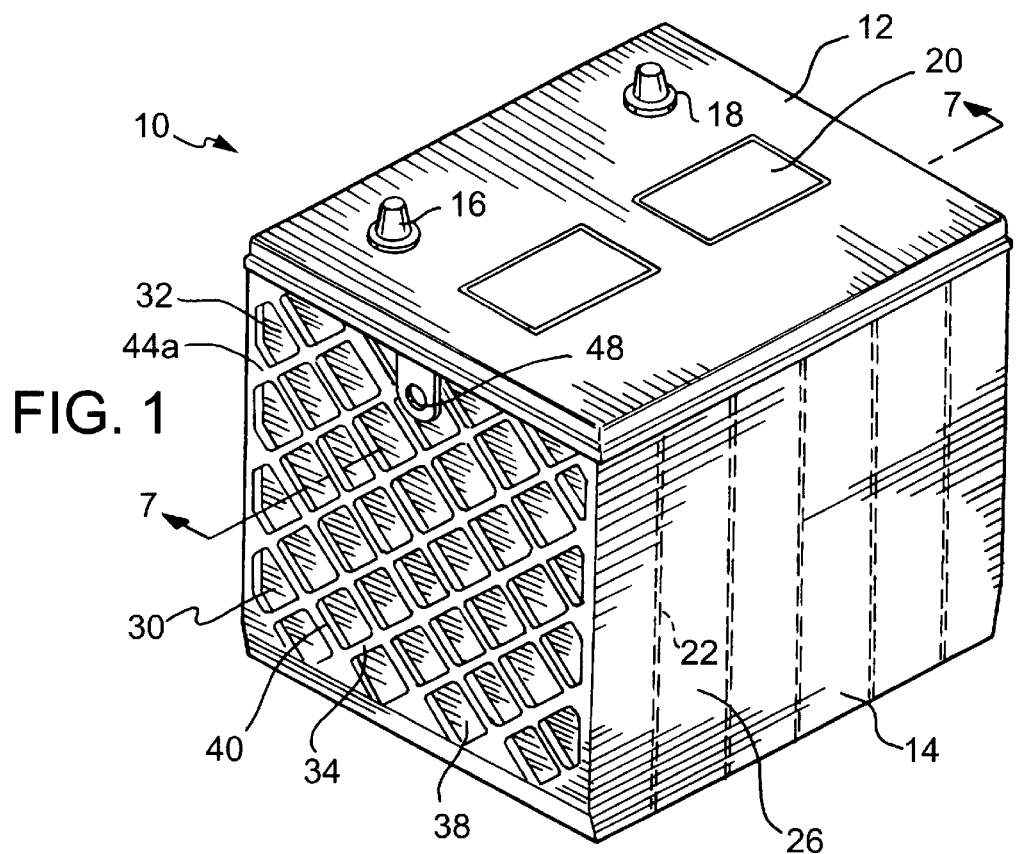
FIG. 1 is a perspective view of a battery including a plastic battery container incorporating teachings of the invention.

Turning now to the drawings, there is shown in FIG. 1, a perspective view of a battery 10, which includes a top 12 and a container 14. The embodiment illustrated is a top terminal battery and, accordingly, the top 12 includes the battery terminals 16, 18 and a venting structure 20. An alternate terminal structure may be provided, however, wherein the terminals are along a side of the battery (as in a side terminal battery), or along both the top and a side of the battery (as in a dual terminal battery).

Figure 7:
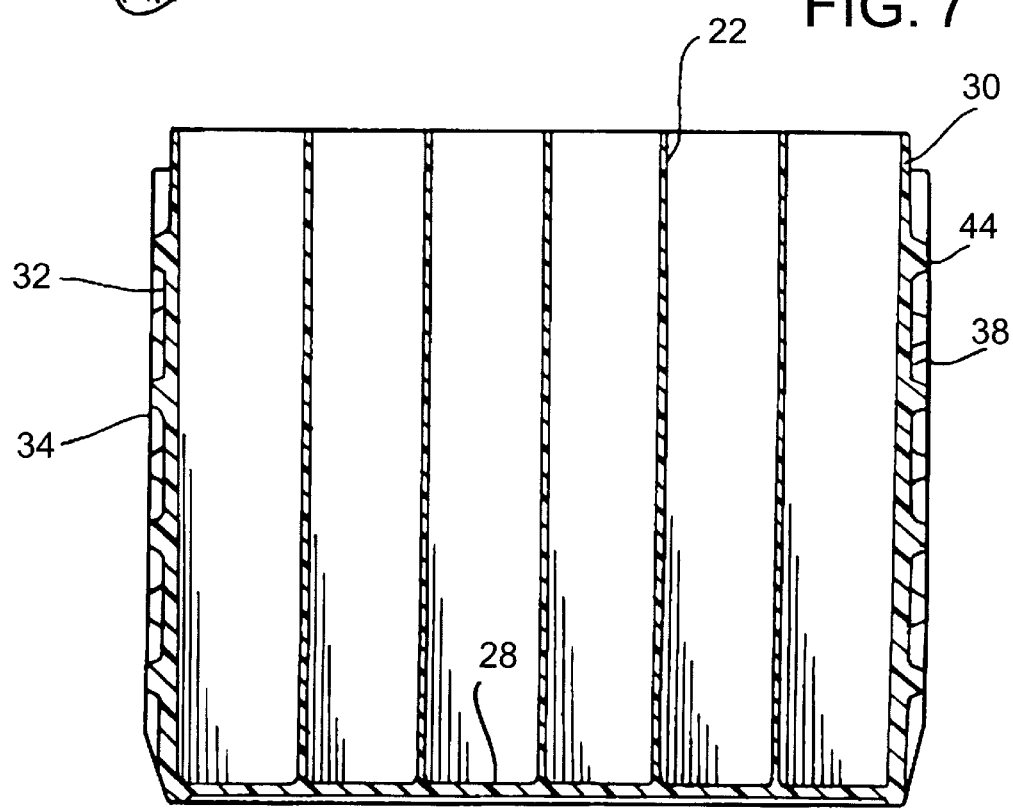
FIG. 7 is a cross-sectional view of the battery container taken along line 7—7 in FIG. 1.

The battery container 14 is divided into a series of internal cells by cell partitions 22. As illustrated, six cells, which contain the chemical components of the battery 10, are provided for a twelve volt battery, as is of course customary for automotive SLI batteries, for a six volt battery, only three cell will be used, and the like. The cell partitions 22 are preferably integrally molded with the container 14, extending between the container side walls 26 and the container bottom 28 (see FIG. 7). It will thus be appreciated that during use, the cell partitions 22 restrain the side walls 26 as well as the bottom 28 to limit any bulging thereof as a result of the elevated pressures and temperatures associated with operation of a lead-acid battery.

In accordance with the invention, end walls 30 of the container 14 are of an integrally molded structure, having a base portion 32 from which extends a series of ribs 34 which likewise restrain the end walls 30 of the container 14 operation. According to an important feature of the invention, the ribs 34 are disposed at other than a normal angle to the horizontal bottom 28 of the battery container 14, that is, diagonally. In this way, the ribs 34 present a honey-comb type configuration having a series of approximately diamond-shaped relatively flat spots 38 at which the ribs 34 meet the base portion 32. It has been determined that ribs 34 disposed at approximately +/−45° to the horizontal bottom surface of the container 14, as shown in the figures, provides the best opposition to the deflection forces asserted against the container end walls 30. It will be appreciated, however, that the ribs may be disposed at slightly greater or less than +/−45° and still provide improved, though slightly less effective, deflection resistance.

In order to effectively minimize deflection in the end walls 30 of the container 14 during use, a sufficient number of ribs must be incorporated. The number of ribs 34 incorporated depends upon the spacing, as well as the height and width of the container end wall 30. Preferably, the crests 40 of the ribs 34 are on the order of no more than 1.25 inches apart. In the currently preferred design, six ribs 34 are disposed at each +45° and −45°, such that the crests 40 of the ribs 34 are less than one inch apart. It will be appreciated by those skilled in the art, however, that the spacing and number of ribs 34 may vary, so long as the desired strength is obtained.

In order to minimize differences in shrinkage of various portions of the container 30, the container side walls 26 and the base portion 32 of the end walls 30 are of substantially similar thickness, and are not disparately thicker than the partitions 22. In this way, the container walls 26, 30 retain substantially the same relative geometry during molding to ultimately produce an appealing molded part of the desired dimensions. It will be appreciated by those skilled in the art that the ribs 34 thus will have minimal affect on the shrinkage of the end walls 30, while increasing the over resistance of the end wall 30 to deflection due to internal forces.

In the preferred embodiment of the container design, the container side walls 26 have a thickness on the order of 0.150 inch, while the partitions 22 have a thickness of 0.065 inch at the top edge and a thickness of 0.130 to 0.140 inch at the bottom. The base portion 32 of the container end walls has a thickness on the order of 0.210 inch. The ribs 34 are on the order of 0.175 inch. In a group 27 battery of this design, the deflection of the end walls 30 at 2 p.s.i. it was approximately 0.014 inch; at 4 p.s.i. it was approximately 0.028 inch; and at 6 p.s.i. it was approximately 0.045 inch. Accordingly, a container constructed according to teachings of the invention yielded considerably less deflection than the standard container design having vertical ribs (set forth in the Background of the Invention section).

Figure 4:
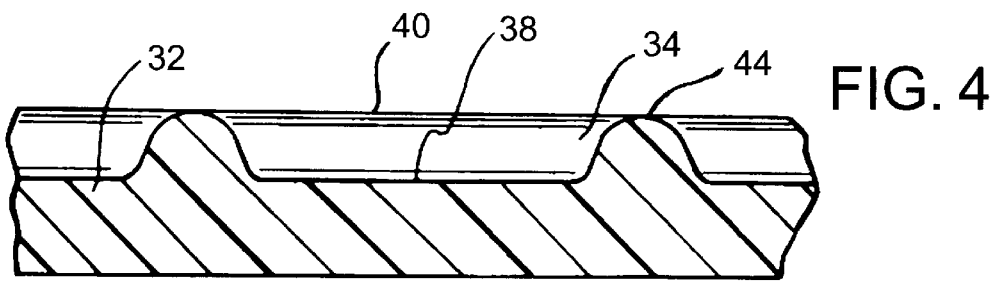
FIG. 4 is a fragmentary cross-sectional view taken along line 4—4 in FIG. 3.
Figure 5:
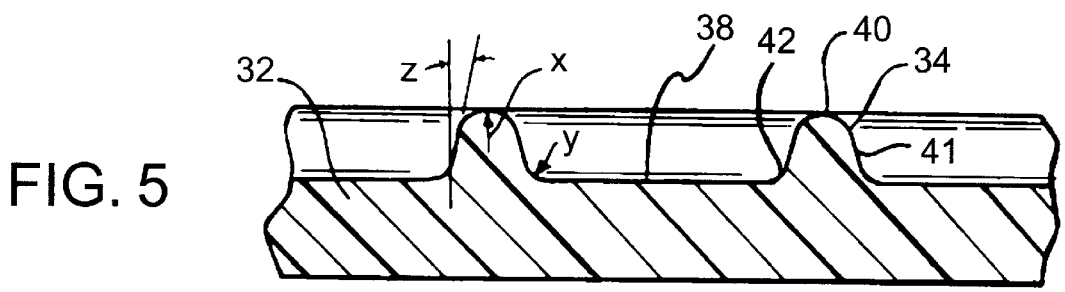
FIG. 5 is a fragmentary cross-sectional view taken along line 5—5 in FIG. 3.
Figure 6:
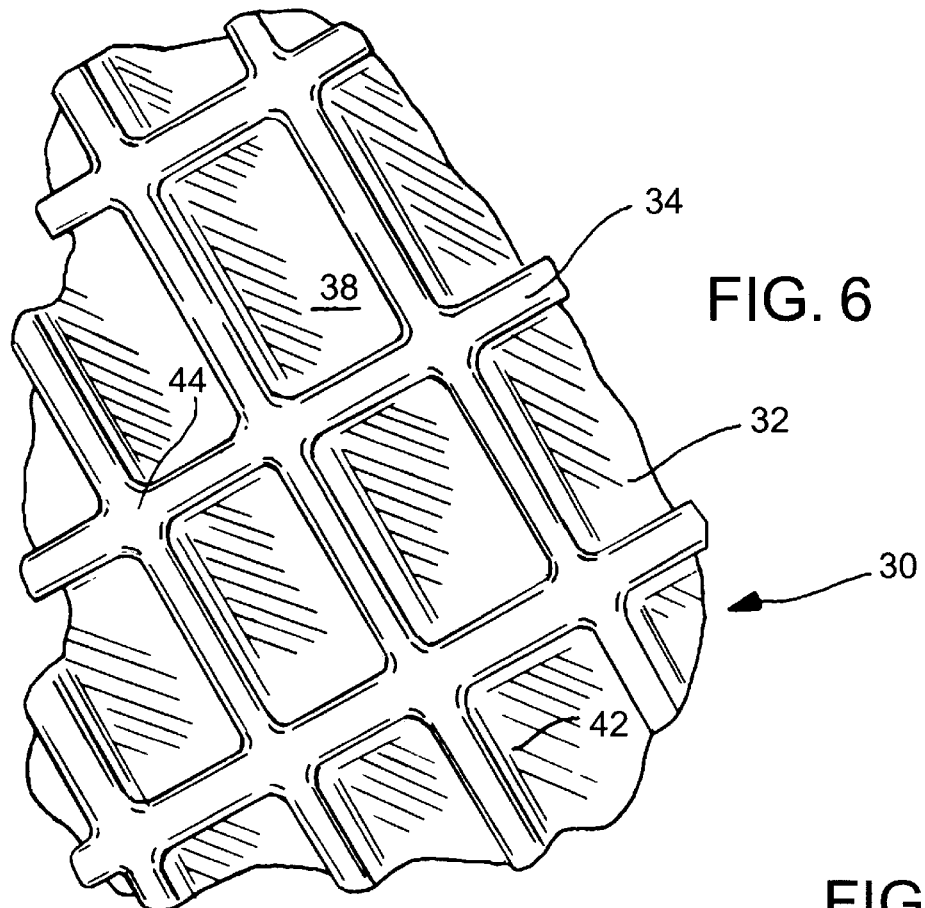
FIG. 6 is an enlarged fragmentary perspective view of the end wall of the battery container as illustrated in FIG. 1.

According to another important feature of the invention, in order to facilitate molding and minimize costs associated with production of the container 14, each of the corners of the rib structure are rounded. As may be seen in FIG. 5, the ribs 34 are preferably rounded along their crests 40, as well as along the intersection or edges 42 at which the sides 41 meet the base portion 32. Additionally, the corners of the diamond shaped flat spots 38 are similarly rounded at the corners, and round up into the intersection 44 of the ribs 34, as best seen in FIG. 4. In the preferred embodiment, the corners of the diamond-shaped flat spots 38 (i.e., at the intersections 44 of the ribs 34) have a radius w on the order of 0.090 inch; the crests 40 of the ribs 34 have a radius x on the order of 0.090 inch; the inner edge 42 at the base portion has a radius y of approximately 0.060 inches; and the sides of the crests 40 are at a draft angle z on the order of 9° from vertical. It will be appreciated by those skilled in the art that the measurements identified for the preferred embodiment are, of course, only exemplary figures. These numbers may vary while achieving similar desired results within the purview of the invention. For example, the crests 40 of the ribs 34 may typically have a radius x within a range of 0.060 and 0.120 inch.

It will further be appreciated that that these rounded features of the container 14 provide a part that may be more easily demolded than would be possible with sharper edges. Additionally, the rounded edges minimize water retention during processing. As a result, the inventive design reduces plant labor costs associated with manufacturing the container 14.

It will be further appreciated that the rounded edges of the part provide for optimal plastic flow within the mold. As a result, the molded part exhibits superior density characteristics. More specifically, the molded part has a lower porosity than a part molded with edges having a square characteristic. Further, the improved flow characteristics within the mold result in quicker molding time, further minimizing manufacturing costs.

It will be appreciated that the ribs 34 may result in additional effective thickness of the end wall 30, even though the end wall 30 is not a uniformly thick structure. In order to maintain the original footprint of the battery 10, the ribs 34 along the edge of the end wall 30 adjacent the bottom 28 of the container 14 are angled toward the base portion 32, as may best be seen in FIG. 1.

Figure 2:
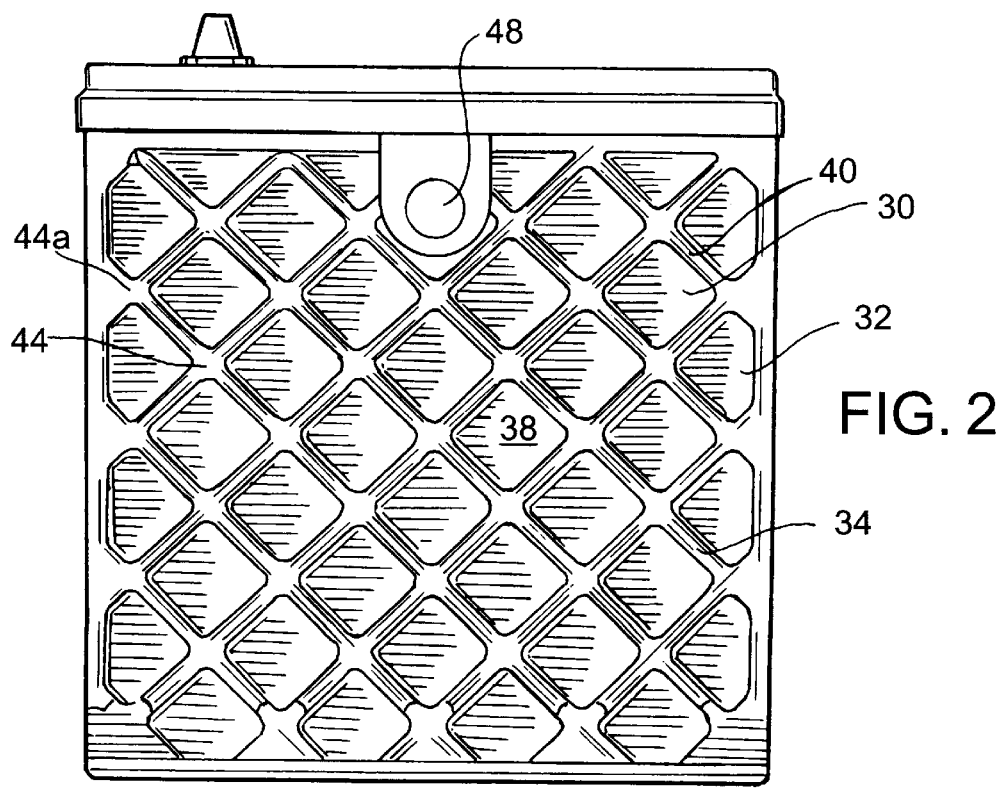
FIG. 2 is side elevational view of the battery of FIG. 1.
Figure 3:
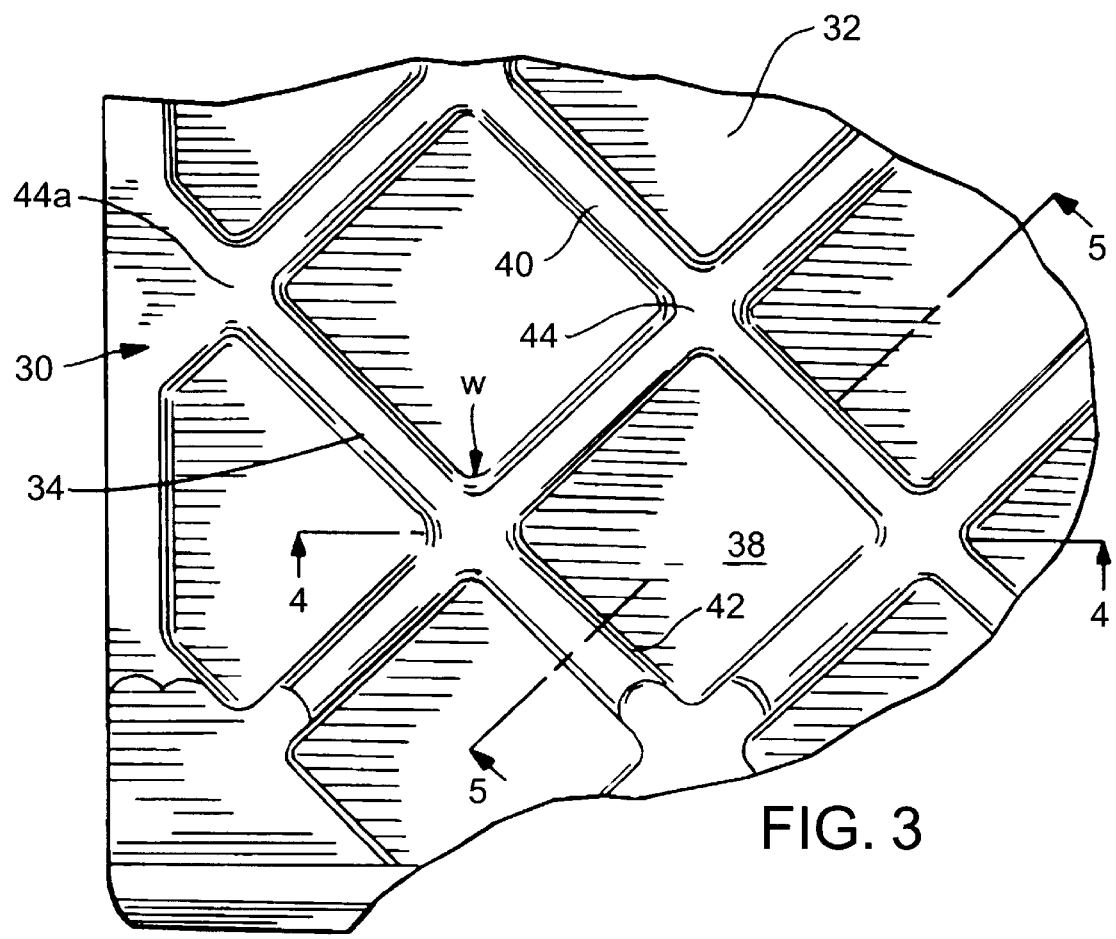
FIG. 3 is an enlarged fragmentary view of the lower left corner of the battery as illustrated in FIG. 2.

As may be seen in FIGS. 1–3, the intersections 44a of the ribs 34 located toward the side walls 26 of the container 14 are disposed slightly inward from the outside edge of the end wall 30. Preferably, the height of these intersections 44a extends outward to the edge of the end wall. In this way, additional strength is provided to the end wall 30 along the critical joint with the side walls 26.

As shown in FIGS. 1 and 2, the attachment point 48 for the handle is disposed along the upper portion of the end wall 30. It will be appreciated, however, that any appropriate handle design and attachment location may be utilized.

Any thermoplastic material and filler may be utilized which possesses the desired characteristics for molding battery containers pursuant to this invention. As is well known, the currently used materials for SLI lead-acid batteries comprise an ethylene-propylene impact-modified copolymer in which polypropylene is a major constituent.

In summary, the invention provides a container design that provides enhanced resistance to deformation of the end walls due to internal pressures and internal and external temperatures developed during use. The rib structure increases the effective thickness and strength of the end wall without uniformly increasing the thickness of the end wall. Accordingly, the container may be fabricated minimizing molding difficulties related to differences in shrinkage rates. Additionally, rounded edges of substantially all locations where the ribs meet the base portion provide good material flow characteristics, an easily demolded part, and minimal retention of water during processing, thus providing an easily and economically fabricated part.

We claim as our invention:

1. A plastic container for a recombinant sealed lead acid battery having a series of cells for containing the electrochemical components of the battery, the cells being separated by partitions having ends, the container further having two side walls disposed adjacent the ends of the partitions, and two end walls each disposed adjacent a respective cell, at least one of said end walls comprising a base portion and a series of ribs disposed at angle on the order of +/−45° to the horizontal, said ribs being integrally molded with said base portion, whereby the ribs function to minimize deflection of said end wall during battery usage, said ribs having a crest and sides, said sides approaching the base portion at an edge, said edge being rounded.

2. The container of claim 3 comprising at least four ribs disposed on the order of +45° to the horizontal and at least four ribs disposed on the order of −45° to the horizontal.

3. The container of claim 1 wherein said ribs have a crest and sides, said crest having a rounded upper surface.

4. The container of claim 3 wherein the rounded upper surface of the crest has a radius on the order of 0.060 inch and 0.120 inch.

5. The container of claim 3 wherein the sides of the ribs are disposed less than on the order of 1¼ inches apart.

6. The container of claim 1 wherein said ribs are substantially parallel and are disposed on the order of one inch apart.

7. The container of claim 1 wherein the edge has a radius on the order of 0.060 inch.

8. The container of claim 2 wherein the container is molded of an ethylene-propylene impact-modified copolymer.

9. The container of claim 2 wherein the end wall has edges disposed adjacent the side walls, said ribs being angled downward toward the base portion along said edges.

10. The container of claim 3 wherein said sides extend downward and outward toward the base portion at an angle to a plane extending normal to the base portion, substantially each said side meeting the base portion at a rounded edge.

11. The container of claim 10 comprising at least four ribs disposed on the order of +45° to the horizontal and at least four ribs disposed on the order of −45° to the horizontal.

12. The container of claim 10 wherein the rounded crest has a radius on the order of 0.060 inch to 0.120 inch.

13. The container of claim 10 wherein the edge has a radius on the order of 0.060 inch.

14. The container of claim 10 wherein the sides of the ribs are disposed less than on the order of 1¼ inches apart.

15. The container of claim 10 wherein said ribs are substantially parallel and are disposed on the order of one inch apart.

16. The container of claim 10 wherein the end wall has edges disposed adjacent the side walls, said ribs being angled downward toward the base portion along said edges.

17. The container of claim 10 wherein the container is molded of an ethylene-propylene impact-modified copolymer.

18. The container of claim 10 comprising at least six ribs disposed on the order of +45° to the horizontal and at least six ribs disposed on the order of −45° to the horizontal.

* * * * *